United States Patent [19]

Galiasso et al.

[11] Patent Number: 4,801,432
[45] Date of Patent: Jan. 31, 1989

[54] APPARATUS FOR WITHDRAWING PARTICULATE SOLID FROM A HIGH PRESSURE VESSEL

[75] Inventors: Roberto E. Galiasso, San Antonio de Los Altos; Jose I. Belandria, Merida; Pasquale L. Caprioli, Caracas, all of Venezuela

[73] Assignee: Intevep, S.A., Caracas, Venezuela

[21] Appl. No.: 917,353

[22] Filed: Oct. 9, 1986

Related U.S. Application Data

[63] Continuation of Ser. No. 817,404, Jan. 9, 1986, Pat. No. 4,664,782.

[51] Int. Cl.⁴ .......................... B01J 8/18; F27B 15/00
[52] U.S. Cl. ..................................... 422/143; 422/311
[58] Field of Search ................ 422/143, 311; 208/143, 208/146, 152, 165, 166, 168, 171, 173, 107

[56] References Cited

U.S. PATENT DOCUMENTS

| | | | |
|---|---|---|---|
| 23,942 | 2/1955 | Shabaker | 208/171 X |
| 2,841,476 | 1/1958 | Dalton | 422/143 |
| 2,897,138 | 7/1959 | Ardern | 208/171 X |
| 4,392,943 | 7/1983 | Euzen et al. | 208/166 X |
| 4,444,653 | 4/1984 | Euzen et al. | 208/152 |
| 4,664,782 | 5/1987 | Galiasso et al. | 208/143 |

Primary Examiner—William R. Dixon, Jr.
Assistant Examiner—Ann M. Knab
Attorney, Agent, or Firm—Bachman & LaPointe

[57] ABSTRACT

The particulate solid is maintained in a bed in contact with a liquid within a high pressure vessel. The particulate solid is supported in the vessel in a cone-like configuration. A discharge tube is provided communicating with the particulate solid running from the bottom of the cone externally of said vessel and pressure on the supported particulate is produced to discharge said particulate out of said vessel via the discharge tube.

5 Claims, 4 Drawing Sheets

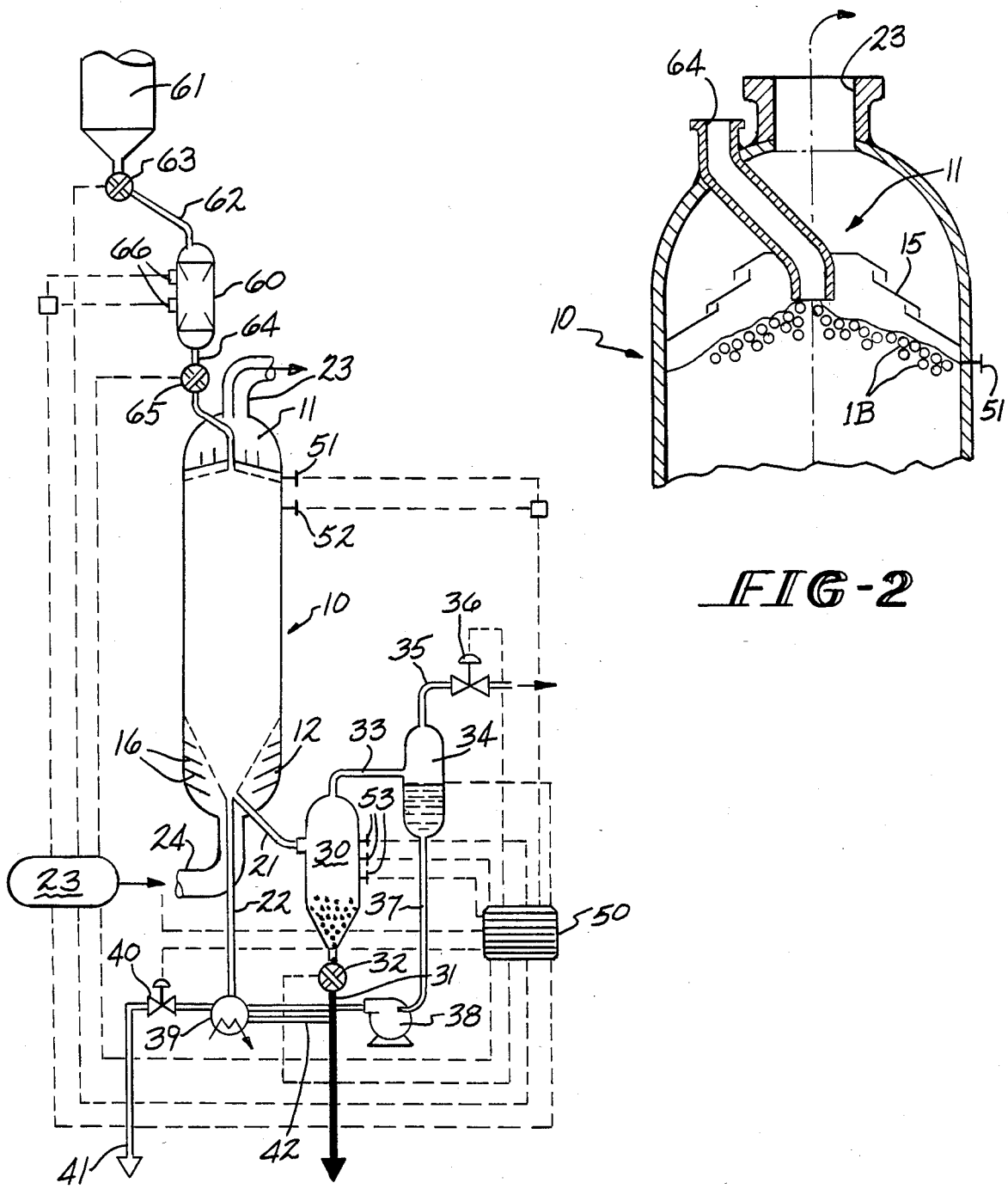

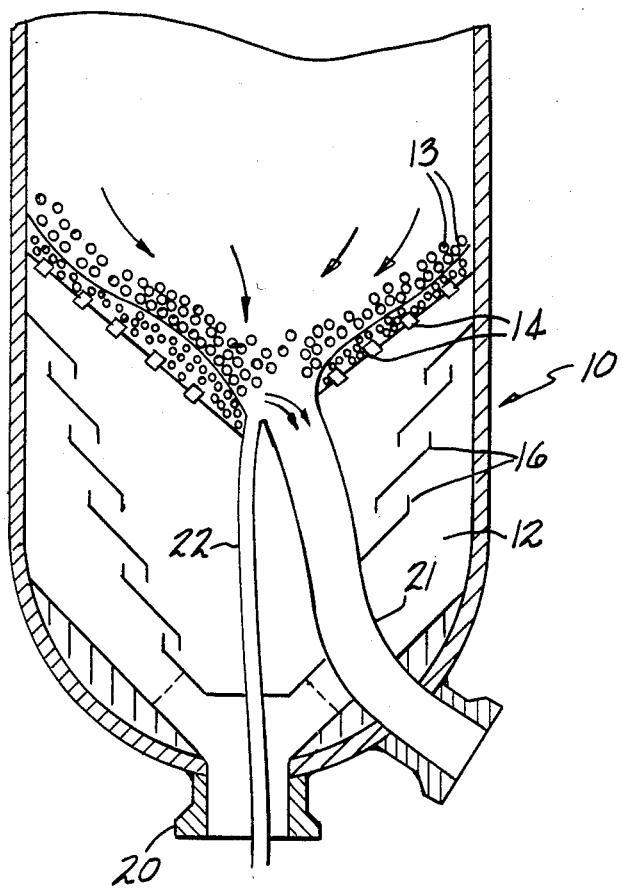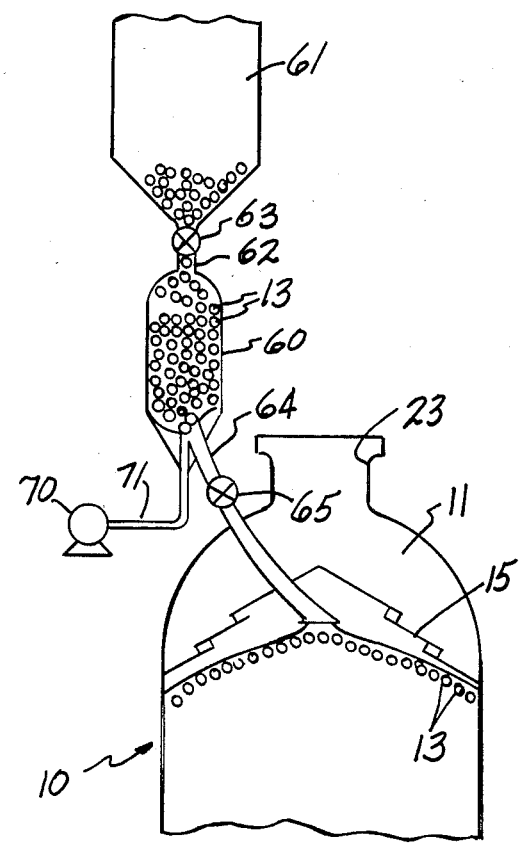
FIG-3
FIG-4

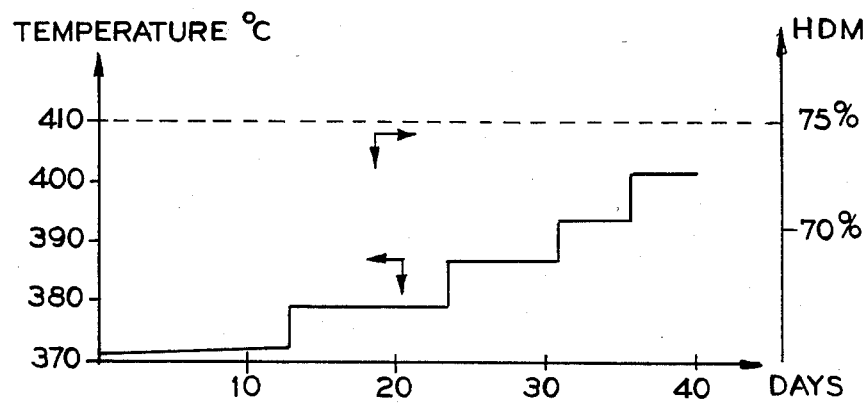
FIG-5 TEST I. RISE IN TEMPERATURE AS A FUNCTION OF TIME ON STREAM.
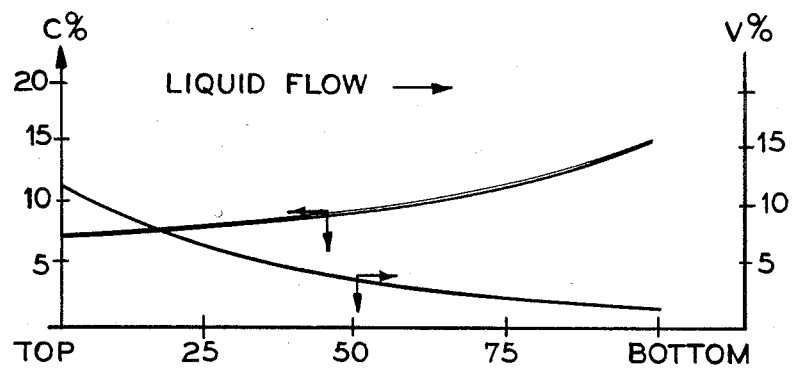
FIG-6 CARBON AND VANADIUM AS A FUNCTION OF LENGTH OF REACTOR (TEST I)
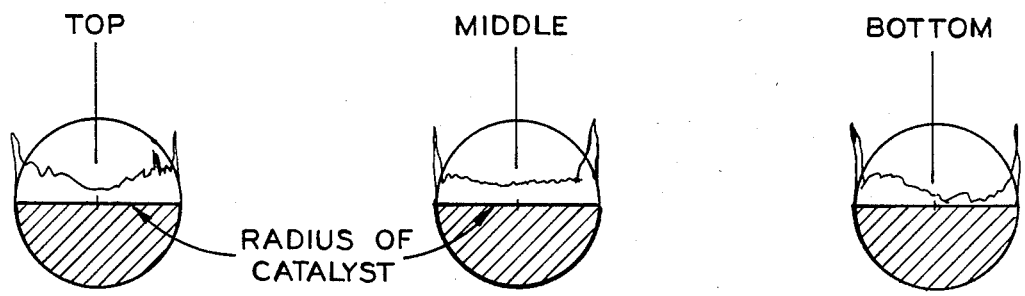
VANADIUM DISTRIBUTION IN THE CATALYST PARTICLE MICROPROBE X RAY ANALYSIS (TEST I)
FIG-7A   FIG-7B   FIG-7C

TEST II. CHANGE IN DEMETALIZATION DURING
TIME ON STREAM

TEST II. CARBON AND VANADIUM AS A FUNCTION
OF LENGTH OF REACTOR

TEST II. VANADIUM DISTRIBUTION IN THE CATALYST
PARTICLE MICROPOBE X RAY ANALYSIS

APPARATUS FOR WITHDRAWING PARTICULATE SOLID FROM A HIGH PRESSURE VESSEL

CROSS REFERENCE TO RELATED APPLICATIONS

This application is a division of application Ser. No. 817,404 filed Jan. 9, 1986, now U.S. Pat. No. 4,664,782 issued May 12, 1987.

BACKGROUND OF THE INVENTION

The present invention relates to an improved method and apparatus for discharging particulate solids maintained in contact with fluid within a high pressure vessel.

The improvements provided in accordance with the present invention are broadly applicable to the discharge of particulate solids maintained in contact with fluids, i.e., liquid and/or gases, from vessels in which various types of reactions, conversions or the like operations are carried out at super-atmospheric pressure. However, the present invention is particularly useful in the withdrawal of particulate solids as for example catalyst material from a liquid hydrocarbon treatment zone. For example, the present invention has particular application in the removal of spent catalyst material from a treatment zone in which a heavy hydrocarbon oil is contacted with gaseous hydrogen at high temperatures as for example between about 200° and 850° C. and high pressures as for example between about 1000 and 5000 psig for the purpose of effecting hydrocracking, hydrodesulfurization or the like hydrogenation reactions. To effect hydrogenation reactions of this type, it has been found advantageous to pass the hydrocarbon material and hydrogen upwardly through a bed of particulate catalyst material under conditions such that the catalyst particles are maintained in random motion to become a so-called "ebullated" bed.

It is an object of the present invention to provide an efficient, expeditious and effective method and apparatus for discharging particulate solid in admixture with fluid from a high pressure vessel.

It is a further object of the present invention to provide a method and apparatus as aforesaid whereby the fluid may be efficiently and economically separated from the particulate solid.

It is a still further object of the present invention to provide an improved process and apparatus as aforesaid for removing particulate solid in admixture with liquid hydrocarbon and hydrogen from a high pressure hydrogenation zone.

The foregoing and further objects and advantages of the present invention will appear from a consideration of the following specification.

SUMMARY OF THE INVENTION

In accordance with the present invention it has been found that the foregoing objects and advantages of the present invention may be readily obtained.

Thus, the method of the present invention relates to particulate solid maintained in a bed in contact with a liquid within a high pressure vessel. The method comprises providing a high pressure vessel having a bottom and a top and containing therein a bed of particulate solid in contact with a liquid, supporting the particulate solid in the vessel in a cone-like configuration spaced from the bottom of the vessel, providing a discharge tube communicating with the particulate solid running from the base of the cone externally of said vessel, and producing pressure on the supported particulate to discharge said particulate out of the vessel via said discharge tube. The particulate solid is preferably a hydrogenation catalyst. In the preferred embodiment liquid hydrocarbon add hydrogen feed is introduced into the reaction vessel, the feed is passed upwardly through the reaction vessel and particulate solid to perform a hydrogenation reaction, and liquid and gaseous reactor effluent is removed from the top of the reactor. It is preferred to introduce additional liquid hydrocarbon feed into the base of the bed at a point adjacent the discharge tube to produce pressure on the supported particulate and discharge same out of the vessel via the discharge tube. It is a significant advantage of the process of the present invention that one can remove at least a portion of the particulate solid during the course of the hydrogenation reaction. It has been found that such a procedure gives optimum results.

The apparatus of the present invention is a device for withdrawing particulate solid maintained in a bed in contact with a liquid within a high pressure vessel. The device comprises a high pressure vessel having a bottom and a top, a bed of particulate solid within said vessel in contact with a liquid, means for supporting the bed in the vessel in a cone-like configuration spaced from the bottom of the vessel, a discharge tube communicating with the particulate solid running from the support means externally of said vessel, and means for producing pressure on the supported particulate to discharge said particulate out of said vessel via said discharge tube. As indicated hereinabove, the particulate solid is preferably a hydrogenation catalyst. Inlet means is preferably provided at the bottom of the vessel for introduction of feed comprising hydrocarbon and hydrogen material, and outlet means is preferably provided at the top of the vessel for removal of liquid and gaseous reactor effluent. Distribution baffles are preferably provided at the bottom of the vessel between the inlet means and the particulate solid to provide even distribution of the feed throughout the vessel. A second inlet is preferably provided for the introduction of additional liquid hydrocarbon feed beneath the bed. Tube means are provided passing from the second inlet to the bed at a point adjacent to the discharge tube to produce pressure on the supported particulate to separate the particulate into a free-flowing form and discharge the particulate out of the vessel via the discharge tube.

The foregoing and other features of the present invention will appear hereinbelow.

BRIEF DESCRIPTION OF THE DRAWINGS

The process and apparatus of the present invention will be more readily understandable from a consideration of the following illustrative drawings wherein:

FIG. 1 is a partially schematic flow-sheet of the overall process and apparatus of the present invention;

FIG. 2 is a detailed sectional view of the top of the reactor of FIG. 1;

FIG. 3 is a detailed sectional view of the bottom of the reactor of FIG. 1;

FIG. 4 is a sectional view of the top of the reactor of FIG. 1 showing the introduction of particulate material into the reactor;

FIG. 5 is a graph of comparative data showing the rise in temperature as a function of time on stream;

FIG. 6 is a graph of comparative data showing carbon and vanadium as a function of length of reactor;

FIGS. 7a, 7b and 7c show vanadium distribution in the catalyst particle by microprobe x-ray analysis for comparative data;

DETAILED DESCRIPTION

Figure 8:
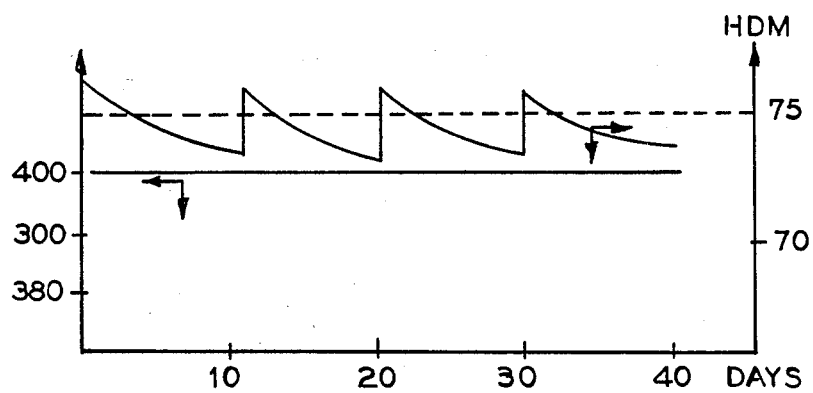
FIG. 8 is a chart of the process of the present invention showing the change in demetallization during the time on stream.

The present invention relates to an improved method and apparatus for removing particulate catalyst from a fixed bed, up-flow type reactor which operates at a high pressure using dynamic pressure without disturbing operation of the reactor and without damage to the catalyst.

The catalyst and reactor operates at a high pressure and temperature. The catalyst is maintained in the reactor as a fixed bed and operates in the up-flow mode in a hydrogenation reaction with the liquid hydrocarbon and hydrogen feed passing upwardly through the catalyst bed. In accordance with the present invention the catalyst is supported in the reactor in the configuration of a fixed cone and the catalyst is withdrawn from the reactor either continuously or discontinuously in order to increase the performance of the bed. The withdrawal of the catalyst is accomplished with the use of a high linear velocity in the bottom of the cone where the catalyst is supported in order to separate the catalyst into a free-flowing form. A dynamic pressure is produced which breaks up the supported catalyst and starts movement of the particulate to a transfer line out of the reactor to a separator for separating catalyst from liquid and gaseous products. A controlled differential pressure is preferably provided between the bottom of the cone and the separator to help the transportation of the solid in the transfer line with the pressure differential preferably controlled to assure the minimum linear velocity in the transfer line and to maintain the catalyst in suspension in the transfer line.

Preferably liquid hydrocarbon feed is introduced at a high linear velocity at the bottom of the cone to produce the dynamic pressure and separate the catalyst into a free-flowing form. The excess of liquid pumped into the reactor for this purpose is discharged with the catalyst via the transfer line to the separator without changing the conditions in the reactor. The fixed bed is not fluidized or disrupted because the action of the liquid stream is restricted only to the bottom of the catalyst supporting cone. During the catalyst withdrawal, therefore, the reactor continues to operate as an up-flow, fixed bed reactor with the fixed bed moving downwardly to accommodate the area vacated by catalyst removal.

When the desired amount of catalyst is removed, fresh catalyst is added from a pressurized vessel with appropriate means, as a valve or using higher pressure than the reactor itself.

The liquid and gaseous products are separated from the catalyst in the separator with the liquid and gaseous products leaving the top of the separator to a secondary high temperature, low pressure separator. Gas is removed from the top of the secondary separator and liquid from the bottom, both for recycling. Catalyst material is removed from the bottom of the separator for recycling.

The reactor of the present invention is used for the hydrogenation of hydrocarbons, as heavy oils or its residuum, such as demetallization of heavy Tia Juana crude. Preferably a portion of the catalyst is periodically removed during the operation of the reactor, as for example 10% catalyst removal each week. The withdrawal operation takes less than one hour and does not disturb operations.

Any of the conventional hydrogenation catalysts can be used, for example, cobalt, iron, nickel, tungsten, molybdenum, etc., as well as their sulfides and oxides alone or together with other suitable catalysts or on supports. Generally speaking the catalyst particles can be extrudates or spheres or other irregular shapes and can have an average equivalent diameter between 1/32 and 1/5 inch, although other sizes or shapes can be readily accommodated.

As indicated hereinabove, the reactor operates at high pressure and high temperature. The linear liquid velocity used in the particulate bed is between 0.1 and 0.7 cm/sec. The gas (hydrogen) to liquid ratio may be readily varied as between 300 to 10000 cc/liter. The feedstock could be partially vaporized in the reactor under the operating conditions; however, in all cases the liquid content of the feedstock in the reactor must be higher than 10% in order to maintain proper operation of the particulate bed and also in order to perform catalyst withdrawal by liquid with minimal differential pressure in the transfer line. Normally, heavier feedstocks are preferred.

Referring specifically to the drawings, FIG. 1 represents a partially schematic flow sheet of the overall reaction and apparatus of the present invention. High pressure vessel or reactor 10 having a top 11 and bottom 12 is provided with a bed of particulate solid catalyst material 13, see FIGS. 2 through 4 wherein the particulate material is partially shown in the reactor. The particulate material is supported in reactor 10 in a cone-like configuration as clearly shown in FIG. 3 by a supporting means 14 which may be a bubble tray or the like permitting flow of liquids and gases therethrough arranged in a cone-like configuration disposed at the lower portion of the reactor spaced from the bottom of the reactor. In the top 11 of the reactor a disengaging plate 15 prevents expansion of the catalyst bed during the process. In addition, baffles 16 are provided at the bottom 12 of the reactor in order to properly distribute the feedstock throughout the reactor. The reactor itself can be a conventional hydrogenation reactor as for example a conventional hydrodesulfurization reactor providing that the length to diameter ratio is preferably higher than 5 in order to have a large hydrostatic pressure on the bottom cone. The baffles and the disengaging plate assist in proper catalyst distribution and appropriate liquid and gas distribution to prevent channeling. This is especially significant after fresh catalyst is loaded into the reactor since short circuiting could occur in the reactor. Naturally, it is desired to have proper catalyst and feedstock distribution throughout the reactor. Thus, as shown the bed of particulate catalyst fills the reactor from supporting means 14 to or below disengaging plate 15.

Inlet means 20 are provided in the bottom of the reactor for introduction of feedstock from feedstock storage means shown schematically as reference numeral 23 via line 24. The feedstock flows upwardly in the reactor contacting baffles 16 for proper distribution throughout the reactor. A discharge tube 21 is provided communicating with the particulate solid 13 and running from the support means externally of said vessel. In addition, means 22 are provided for producing pressure on the supported particles 13 to discharge said particles out of reactor 10 via discharge tube 21. As shown in FIG. 3 the means 22 is a second inlet for introducing feedstock beneath the bed adjacent discharge tube 21. The introduction of additional feedstock via second inlet 22 creates a high linear velocity at the base of the cone. Normally, the particulate is supported on the cone. However, the high linear velocity of the feedstock from second inlet 22 creates a dynamic pressure, breaks up the supported particulate and causes flow of particulate and feedstock out of the reactor via discharge tube 21.

Thus, in accordance with the operation of the reactor, liquid and gas feedstock enters reactor 10 from bottom inlet 20, is distributed throughout the reactor 10 via baffles 16 so as to be progressively distributed under cone 14 which supports the catalyst. Reactor effluent passes out of the top of the reactor via outlet 23. When it is desired to remove particulate from the reactor additional liquid feedstock is introduced via second inlet 22 at the bottom of the cone where the catalyst is supported in a solid mass-like arch. Normally unconverted liquid feedstock is pumped in through second inlet 22 in order to provide dynamic pressure on the supported arch of catalyst and break up the arch and force the catalyst out discharge tube 21 in a flow pattern shown by the arrows in FIG. 3. When the arch of catalyst is destroyed by the dynamic pressure of the additional feedstock via second inlet 22, catalyst and liquid is removed via discharge tube 21. This procedure is operative even when the catalyst is adhered together by for example vanadium and carbon material in view of the liquid pressure which breaks up the lumps of catalyst. This procedure has been found to be particularly effective and represents a significant advantage over procedures employed heretofore.

Referring to FIG. 1, particulate material 13 removed from reactor 10 via discharge tube 21 is transported to high temperature separator 30. From separator 30 the particulate material is separated from the slurry and discharged out the bottom of separator 30 via discharge line 31 and a rotating high pressure, high temperature valve 32 for recycling, reprocessing, or storage. Liquid and gas are separated from the slurry via line 33 to second separator 34. Second separator 34 separates gas and discharges same from the top of the second separator via line 35 and valve 36 for storage or recycling. Liquid is discharged from the bottom of second separator 34 via line 37 and high temperature, high pressure pump 38. The bottom of second separator 34 may be provided with a filter system to avoid passing fines to pump 38. Pump 38 may transfer liquid to heater 39 and from heater 39 to second inlet 22 for recycling. Alternatively, liquid may be transferred via valve 40 and line 41 for storage or recycling, or via line 42 to flush discharge line 31.

Microprocessor 50 is provided to control the various functions as shown by the dashed lines running from the microprocessor. Naturally, if desired the functions may be manually controlled. Thus, solid level detector or detectors 51 and liquid level detector or detectors 52 may be provided in reactor 10 controlled by microprocessor 50 to insure proper solid and liquid levels in reactor 10. The microprocessor may also control solid level detectors 53 in separator 30 and valve 32 for discharge of particulate from separator 30. The microprocessor may also control valve 36 for discharge of gas from second separator 34. The microprocessor can also control valve 40 for discharge of liquid from second separator 34.

Catalyst feed is stored in high temperature, low pressure vessel 60 connected to low pressure, low temperature vessel 61 via line 62 and valve 63. Vessel 60 is connected to reactor 10 via line 64 and valve 65. Solid level detectors 66 are provided in vessel 60 to maintain particulate level in the vessel. Detectors 66 and valves 63 and 65 are controlled by microprocessor 50.

Thus, in accordance with the present invention if it is desired to remove part or all of the catalyst from vessel 10, one would start to pump heated liquid via second inlet 22. Naturally, additional feedstock could be used if desired. The flow rate is gradually increased to break the solid arch of particulate at the base of the cone, with the actual flow rate depending on such variables as particle size and shape and conditions in the veseel 10. When solid removal commences, the liquid flow rate is maintained in second inlet 22 to complete withdrawal of the desired amount of particulate.

Special attention should be paid to control of differential pressure between separator 30 and the particulate. Normally, the range of differential pressure is around 50–100 psig. This differential can be adjusted stage-by-stage during the particulate withdrawal procedure after particulate withdrawal commences as indicated by the solid level detector.

If solid is not removed, the flow rate in inlet 22 is increased gradually until the solid detector or detectors 51 indicates solid removal. Normally, the maximum velocity is about 5 cm/second. Then the flow rate could be maintained or decreased to the minimum flow rate for solid transfer. To assist solid removal, the differential pressure between reactor 10 and separator 30 could be increased to at or near the maximum value indicated above. Above this value it is possible that the catalyst could be damaged and some solid carry over to second separator 34 take place.

In the preferred embodiment, during discharge the microprocessor 50 starts the catalyst introduction into vessel 10 from vessel 60 using solid detector 51. Alternatively, liquid could be injected into vessel 60 to start particle flow via pump 70 and line 71 (FIG. 4) in a manner after liquid injection in vessel 10.

When the desired amount of catalyst is discharged and fresh catalyst added, the microprocessor reduces the flow rate and could wash the discharge line 31 if necessary to avoid particle sticking in the discharge line.

In order to illustrate the process and apparatus of the present invention a comparative example (Test I) was run using a reactor as shown in FIG. 1 using a flat catalyst support and without changing catalyst during the course of the run compared to a test in accordance with the process and apparatus of the present invention (Test II). Both Tests I and II were for one (1) month duration, and Test II replaced 10% of the catalyst each 5 days of operation. Both tests were up-flow demetallization with a heavy crude feedstock as shown in Table I with hydrogen. In Test I the reactor temperature was increased progressively from 370° C. (start-up temperature) to 400° C. (end of run temperature). Test II was run at a constant temperature. The total pressure in Tests I and II was 1800 psig and the LHSV (ratio of volumetric feed rate of fresh feed to the volume of the reactor) was 0.3.

The level of demetallization in Test I was maintained at 75% and the quality of the product measured at different times. After one month in operation the product quality had changed. The results are shown in Table I and indicate that operating Test I results in quality changes and conversion increases during the course of the run. Considering that conversion is more remunerative than quality, it is clear that income is higher at the end of the run where conversion is higher.

FIG. 5 shows a plot of temperature as a function of time on stream for Test I. FIG. 6 shows the vanadium and carbon loading and FIG. 7 presents the profile of vanadium in the catalyst for the top, the middle and the bottom of the reactor.

In accordance with Test I, using constant demetallization level the rate of metal deposition on the catalyst is constant and metal loading on the catalyst increases linearly as a function of time. Vanadium on catalyst decreases with the length of the reactor. The rate of vanadium deposition on the catalyst is higher in the top of the reactor and lower in the bottom. Looking at the carbon profile the contrary held, there is a higher carbon content in the outlet area than the inlet. Vanadium distribution on the particle is inhomogeneous. More vanadium in the external part of the particle than in the center according to the microprobe analysis shown in FIG. 7.

Using the present invention (Test II) can be observed in Table I that higher conversion of residuum, demetallization and desulfurization occurred. At the same time the initial and final quality of the product is slightly lower, but the change is negligible compared with Test I. The amount of distillate formed in Test II is nearly constant which is a large advantage.

Figure 9:
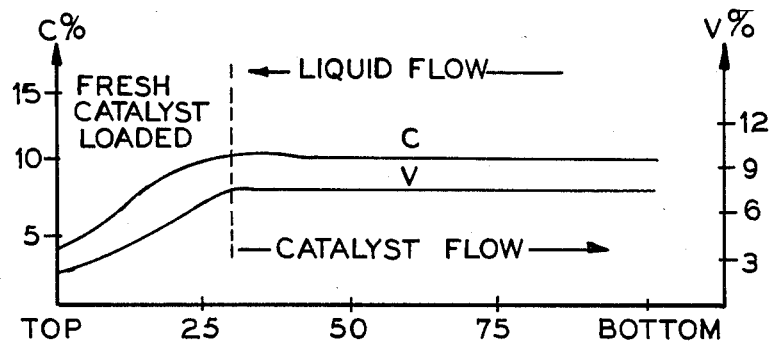
FIG. 9 is a chart of the process of the present invention showing carbon and vanadium as a function of the length of the reactor.

FIG. 8 shows the change in demetallization during the time on stream for Test II, and FIG. 9 shows the carbon and vanadium loading. The carbon and vanadium profile is completely different from Test I showing that up-flow behavior produces lower carbon accumulation and flat vanadium distribution along the bed.

Figures 10A, 10B:
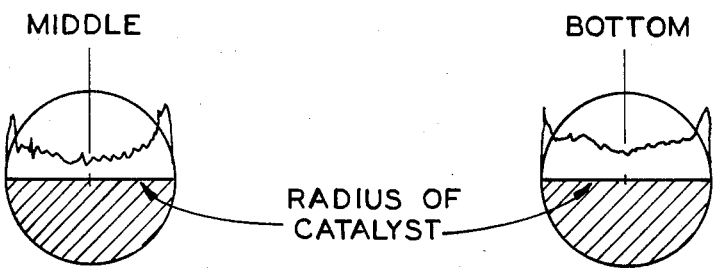
FIGS. 10a and 10b show vanadium distribution in the catalyst particle by microprobe x-ray analysis in the process of the present invention.

Vanadium distribution in the particle is also different showing that a high amount of vanadium is now accumulated in the center of the particle (see FIG. 10) which teaches that the better behavior of the process and apparatus of the present invention.

TABLE I

| PROPERTIES OF THE PRODUCTS | | | | | |
|---|---|---|---|---|---|
| | | TEST I | | TEST II | |
| | FEED | INI-TIAL | FI-NAL | INI-TIAL | FI-NAL |
| PROPERTIES | | | | | |
| API° | 5.0 | 10.2 | 12.0 | 13.0 | 12.0 |
| S % WT | 3.4 | 2.0 | 1.8 | 1.4 | 1.6 |
| V ppm | 700 | 420 | 330 | 290 | 320 |
| H % WT | 9.85 | 10.1 | 10.3 | 10.5 | 10.2 |
| C % WT | 84.7 | 82.6 | 82.3 | 82.1 | 82.4 |
| N % WT | 0.63 | 0.45 | 0.41 | 0.40 | 0.41 |
| CCR % WT | 21.3 | 14.0 | 13.5 | 12.1 | 12.8 |
| ASPH. % WT | 14.0 | 12.5 | 10.7 | 9.7 | 10.6 |
| TEMPERATURE = | | | | | |

TABLE I-continued

| PROPERTIES OF THE PRODUCTS | | | | | |
|---|---|---|---|---|---|
| | | TEST I | | TEST II | |
| | FEED | INI-TIAL | FI-NAL | INI-TIAL | FI-NAL |
| BOILING POINT | | | | | |
| $C_5$-200 | — | 4 | 5 | 9 | 6 |
| 200-305 | — | 9 | 11 | 14 | 12 |
| 350-500 | 12 | 23 | 24 | 24 | 23 |
| 500° C.+ | 88 | 64 | 60 | 53 | 59 |
| $H_2$ CONSUMP./BBL. FT3/B | | 1000 | 1000 | 1000 | 1000 |
| OPERATING CONDITIONS | | | | | |
| P (PSIG) | | 1800 | 1800 | 1800 | 1800 |
| T (°C.) | | 370 | 400 | 400 | 400 |
| LHSV | | 0.3 | 0.3 | 0.3 | 0.3 |
| $H_2$ HC LT/LT | | 1000 | 1000 | 1000 | 1000 |

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An apparatus for withdrawing particulate solid hydrogenating catalyst maintained in a bed in contact with a liquid hydrocarbon and hydrogen feed within a high pressure vessel wherein the feed passes upwardly through said vessel and through said particulate material which comprises: a high pressure vessel having a bottom and a top and first inlet means at the bottom of the vessel for introduction of said liquid hydrocarbon and hydrogen feed at a first linear velocity and outlet means at the top of the vessel for removal of liquid and gaseous reactor effluent; a bed of particulate solid within said vessel in contact with a liquid; means for supporting the particulate bed in the vessel in a cone-like configuration spaced from the bottom of the vessel; a discharge tube communicating with the particulate solid running from the support means externally of said vessel; and means for producing pressure on the particulate bed to discharge said particulate out of said vessel via said discharge tube comprising a second inlet means for introducing additional liquid hydrocarbon feed into said particulate bed at a point adjacent said discharge tube; and means associated with said second inlet means for introducing said liquid hydrocarbon and hydrogen feed through said second inlet at a linear velocity greater than the first linear velocity of said liquid hydrocarbon and hydrogen feed through said first inlet means so as to produce pressure on the particulate bed to discharge said particulate out of said vessel via said discharge tube.

2. An apparatus according to claim 1 including distribution baffles at the bottom of the vessel between the inlet means and the support means to distribute the feed throughout the vessel.

3. An apparatus according to claim 1 including a separator communicating with said discharge tube for receiving the particulate from the vessel.

4. An apparatus according to claim 3 including means to provide a differential pressure between said separator and said vessel to assist in removal of the particulate from said vessel.

5. An apparatus according to claim 1 wherein said second inlet is positioned within said first inlet.

* * * * *